(12) United States Patent
Uda et al.

(10) Patent No.: US 8,568,589 B2
(45) Date of Patent: Oct. 29, 2013

(54) CONNECTION MEMBER AND SEPARATION MEMBRANE MODULE USING THE SAME

(75) Inventors: Yasuhiro Uda, Ibaraki (JP); Toshimitsu Hamada, Ibaraki (JP); Masashi Beppu, Ibaraki (JP); Shinichi Chikura, Ibaraki (JP); Nobuharu Tahara, Ibaraki (JP); Masakatsu Takata, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 232 days.

(21) Appl. No.: 12/865,509

(22) PCT Filed: Feb. 20, 2009

(86) PCT No.: PCT/JP2009/053049
§ 371 (c)(1),
(2), (4) Date: Jul. 30, 2010

(87) PCT Pub. No.: WO2009/107559
PCT Pub. Date: Sep. 3, 2009

(65) Prior Publication Data
US 2011/0000844 A1    Jan. 6, 2011

(30) Foreign Application Priority Data
Feb. 25, 2008  (JP) ................................. 2008-042637

(51) Int. Cl.
*B01D 35/30*  (2006.01)
*B01D 29/56*  (2006.01)
*B01D 63/12*  (2006.01)
*C02F 1/44*  (2006.01)

(52) U.S. Cl.
USPC . 210/335; 210/321.74; 210/232; 210/321.83; 210/541; 210/433.1; 210/252

(58) Field of Classification Search
USPC .......................................................... 210/335
See application file for complete search history.

(56) References Cited

U.S. PATENT DOCUMENTS 4,126,339 A    11/1978  Thompson
6,302,448 B1 *  10/2001  Van Der Meer et al. . 285/123.15
(Continued)

FOREIGN PATENT DOCUMENTS

JP    58-195601 U    12/1983
JP    61-022504 U    2/1986
(Continued)

OTHER PUBLICATIONS

Office Action issued in corresponding Korean Patent Application No. 10-2010-7020756, dated Apr. 30, 2012.
(Continued)

*Primary Examiner* — Benjamin Kurtz
(74) *Attorney, Agent, or Firm* — Knobbe, Martens Olson & Bear LLP

(57) ABSTRACT

Provided are a connection member capable of preventing leakage from a supply side to a permeating side from occurring by a simple means; and a separation membrane module using the connection member. The connection member (20) is used to connect in series a plurality of separation membrane elements equipped with end surface holding members (36) and to install the separation membrane elements in a pressure-resistant vessel (38). The connection member (20) is characterized in that, when the separation membrane elements are connected to each other, the connection member is engaged with respective grooves (36b) of the end surface holding members (36) adjacent to each other.

8 Claims, 5 Drawing Sheets

(56) References Cited

U.S. PATENT DOCUMENTS

| | | | |
|---|---|---|---|
| 6,942,797 B1 * | 9/2005 | Chancellor et al. | 210/321.64 |
| 8,034,241 B2 * | 10/2011 | Beppu et al. | 210/321.74 |
| 2002/0074277 A1 | 6/2002 | Thomassen | |
| 2003/0024868 A1 | 2/2003 | Hallan et al. | |
| 2005/0035047 A1 * | 2/2005 | Colby et al. | 210/321.74 |
| 2006/0070940 A1 | 4/2006 | Colby et al. | |
| 2006/0180540 A1 | 8/2006 | Colby et al. | |
| 2009/0277825 A1 | 11/2009 | Beppu et al. | |

FOREIGN PATENT DOCUMENTS

| | | |
|---|---|---|
| JP | 07-299334 | 11/1995 |
| JP | 09-299766 | 11/1997 |
| JP | 9-299766 | 11/1997 |
| JP | 11-267469 | 10/1999 |
| JP | 11-267470 | 10/1999 |
| JP | 2001-224931 | 8/2001 |
| JP | 2003-334429 | 11/2003 |
| JP | 2004-275822 | 10/2004 |
| JP | 2004-536703 | 12/2004 |
| JP | 2006-212514 | 8/2006 |
| JP | 2006-218387 | 8/2006 |
| JP | 2007-517661 | 7/2007 |
| JP | 2007-190547 | 8/2007 |
| WO | WO 2007/072897 * | 6/2007 |

OTHER PUBLICATIONS

Office Action issued in corresponding Japanese Patent Application No. 2009-038350, dated May 18, 2012.

International Search Report issued in the corresponding PCT Application No. PCT/JP2009/053049, dated May 19, 2009.

Microfilm of the specification and drawings annexed to the request for Japanese Utility Model Application No. 107094/1984 (Laid-open No. 22504/1986), Feb. 10, 1986.

Notice of Rejection Decision dated Nov. 30, 2012 in corresponding Korean patent application No. 10-2010-7020756.

First Office Action dated Aug. 2, 2012 in corresponding Chinese patent application No. 200980102540.8.

* cited by examiner ed in this groove 39.
CONNECTION MEMBER AND SEPARATION MEMBRANE MODULE USING THE SAME This application is the U.S. National Phase under 35 U.S.C. §371 of International Application No. PCT/JP2009/053049, filed Feb. 20, 2009, which claims priority to the Japanese Patent Application No. 2008-042637, filed Feb. 25, 2008. The International Application was not published in English under PCT Article 21(2).

TECHNICAL FIELD

The present invention relates to a connection member used to connect in series a plurality of separation membrane elements equipped with end surface holding members and to install the separation membrane elements into a pressure-resistant vessel, as well as to a separation membrane module using the same.

BACKGROUND ART

Separation membrane modules can be classified into a spiral type, a plain membrane type, a hollow thread type, and others depending on the mode of a separation membrane unit, where, by permeating liquid or gas, components can be separated or concentrated. For example, a spiral-type membrane module generally has a structure such that a plurality of spiral-type membrane elements (hereafter also referred to as "membrane elements") having a tubular shape are connected in series and installed into a pressure-resistant vessel (for example, see the patent document 1). This membrane element typically has a wound body of separation membrane units (hereafter referred to as "wound body") and end surface holding members that hold the end surfaces thereof. Also, the aforesaid wound body has a structure such that a single or plural separation membrane unit including a separation membrane, a supply side flow path material, and a permeation side flow path material are wound around a perforated hollow central pipe.

FIG. 5 is a cross-sectional view of an essential part illustrating an element connection part of a conventional spiral-type membrane module. As shown in this Figure, an end surface holding member 36 is disposed on the end surface of a wound body 32. Also, an FRP (outer cladding material) 31 is wound around the outside of the wound body 32 and the end surface holding member 36. Further, by curing this FRP 31, the FRP 31 is integrated with the wound body 32 and the end surface holding member 36.

A hub plate 36*a* is disposed in the end surface holding member 36. In actually performing fluid separation, a force deriving from the pressure difference between the supply side and the concentration side of the apparatus acts in a direction from the supply side to the concentration side of the membrane element. This force is supported by the end surface holding member 36 disposed on the concentration side. This prevents telescopic phenomenon of the wound body 32 from occurring. Also, in the outer circumferential part of the end surface holding member 36, a groove 36*b* that extends in the circumferential direction thereof is disposed. Further, an annular sealing member 37 is mounted in one of the grooves 36*b* of end surface holding members 36 adjacent to each other. This annular sealing member 37 seals the gap between a pressure-resistant vessel 38 and the FRP 31.

In connecting the membrane elements with each other in series, the two are connected by inserting and innerly fitting a connection pipe 34 into a central pipe 33 in the case of FIG. 5. An annular groove 39 is disposed on the outer circumferential surface near the both ends of the connection pipe 34, and an O-ring 35 is mounted in this groove 39.

In the aforesaid conventional spiral-type membrane module, the membrane elements are not fixed to each other, so that, at the time of starting and stopping the operation, relative displacement occurs mutually in the axial direction, and the O-ring 35 is liable to slide on the inner surface of the central pipe 33. This generates abrasion of the O-ring 35, whereby leakage occurs from the supply side to the permeation side, raising a fear that the water quality may be degraded.

In order to solve such problems, the following patent documents 2 to 4 exemplify a connection member for fixing the membrane elements with each other. However, none of these connection members discloses a constitution of the present invention, and raises a problem such that the work of connecting the membrane elements is cumbersome or the structure is complex.

On the other hand, in accordance with an increase in the scale of membrane processing plants, reduction of the area for disposing a membrane separation apparatus is demanded. Conventionally, use of a membrane element having a diameter of 8 inches (about 200 mm) was prevalent. However, due to the above demand, reduction of the number of membrane elements is desired and, for that purpose, a measure of increasing the membrane area per one membrane element has been progressively taken by increasing the diameter of the membrane element.

Patent Document 1: Japanese Patent Application Laid-open No. 11-267469
Patent Document 2: Translation of PCT Application No. 2007-517661
Patent Document 3: Translation of PCT Application No. 2004-536703
Patent Document 4: Japanese Patent Application Laid-open No. 2007-190547

DISCLOSURE OF THE INVENTION

Problems to be Solved by the Invention

However, when the diameter of the membrane element is increased, a shift is liable to occur in the connection part due to the self-weight thereof, whereby the aforesaid relative displacement of the membrane elements with each other is liable to occur. As a result, by abrasion of the sealing member such as the O-ring mounted between the connection pipe and the central pipe, there is a fear that leakage from the supply side to the permeation side is liable to occur.

The present invention provides a connection member capable of preventing leakage from the supply side to the permeation side by a simple means, as well as a separation membrane module using the same.

Means for Solving the Problems

The connection member of the present invention is a connection member used to connect in series a plurality of separation membrane elements equipped with end surface holding members disposed at ends of the separation membrane elements and to install the separation membrane elements into a pressure-resistant vessel, wherein a groove is formed in the end surface holding member in the circumferential direction of an outer circumferential part thereof, and the connection member bridges across and is engaged with the respective grooves of the end surface holding members adjacent to each other when the separation membrane elements are connected to each other.

The connection member of the present invention can reduce the relative displacement of the separation membrane elements with each other because the connection member bridges across and is engaged with the respective grooves of the end surface holding members adjacent to each other. This can reduce the abrasion of a sealing member such as an O-ring mounted between a connection pipe and a central pipe, whereby leakage from a supply side to a permeation side can be prevented by a simple means. Also, since the separation membrane elements are connected with each other by engagement with the respective grooves, a slight relative displacement of the separation membrane elements with each other is allowed. This can improve the handling property at the time of installing the separation membrane elements into the pressure-resistant vessel.

With respect to the above, it is preferable that the connection member has a frictional resistance reduction structure that reduces frictional resistance on an inner surface of the pressure-resistant vessel. At the time of installing a membrane element having a larger diameter into a pressure-resistant vessel, the frictional resistance to the inner surface of the pressure-resistant vessel will be larger due to the self-weight thereof, and moreover, the frictional resistance between the inner surface of the pressure-resistant vessel and an annular sealing member will be larger, so that the installing work will be difficult. In such a case, when the connection member is provided with the aforesaid frictional resistance reduction structure, the frictional resistance to the inner surface of the pressure-resistant vessel can be reduced, so that the installing work can be carried out easily. A concrete example of the frictional resistance reduction structure will be described later.

With respect to the above, it is preferable that the connection member has a base body that bridges across and is engaged with the respective grooves of the end surface holding members adjacent to each other when the separation membrane elements are connected to each other, and two or more protrusions disposed along the circumferential direction of an outer circumferential part of the base body. According to this constitution, each of these protrusions abuts against the inner surface of the pressure-resistant vessel when the separation membrane elements are installed into the pressure-resistant vessel, whereby contact between the outer circumferential surface of the separation membrane elements and the inner surface of the pressure-resistant vessel can be prevented. This can reduce the frictional resistance at the time of installation, so that the separation membrane elements can be easily installed into the pressure-resistant vessel. Also, when the connection member has the aforesaid two or more protrusions, the separation membrane elements can be placed at the center in the radial direction of the pressure-resistant vessel. This facilitates connection between the pressure-resistant vessel and the connector connected to the central pipe of the separation membrane element located at the most downstream side.

With respect to the above, it is preferable that a through-hole that establishes communication between the inner circumferential part and the outer circumferential part thereof is formed in the connection member. If a high pressure difference is generated between the inside and the outside of the separation membrane element when a sudden pressure change is applied to the separation membrane element, there is a fear that the separation membrane element may be exploded. However, when the aforesaid through-hole is provided, a fluid flows evenly to the outside of the separation membrane element by passing through this through-hole, so that the pressure difference between the inside and the outside of the separation membrane element can be reduced.

With respect to the above, it is preferable that the protrusion is formed with at least one kind of a material selected from hard rubber and a synthetic resin. This is because the frictional resistance at the time of installation can be further reduced, and moreover, it is possible to prevent the aforesaid protrusion from damaging the inner surface of the pressure-resistant vessel. Here, the aforesaid "hard rubber" refers to rubber achieving a score of 90 or more in the durometer hardness test (A type) in JIS K 6253 "vulcanized rubber and thermoplastic rubber—how to determine the hardness".

With respect to the above, it is preferable that the connection member is formed with at least one kind of a material selected from hard rubber, a synthetic resin, and metal. This is because the separation membrane elements can be easily connected with each other.

Also, the separation membrane module of the present invention is a separation membrane module in which a plurality of separation membrane elements are connected in series and installed into a pressure-resistant vessel, wherein the plurality of separation membrane elements are connected in series by using the above-described connection member of the present invention.

In the separation membrane module of the present invention, the above-described connection member of the present invention is used, so that leakage from a supply side to a permeation side can be prevented by a simple means in the same manner as described above, and moreover, the handling property at the time of installing the separation membrane elements into the pressure-resistant vessel can be improved.

With respect to the above, it is preferable that the connection member is the connection member having two or more protrusions, and each of the protrusions abuts against the inner surface of the pressure-resistant vessel when the plurality of connected separation membrane elements are installed into the pressure-resistant vessel. With this constitution, the frictional resistance at the time of installation can be reduced as described above, so that the separation membrane elements can be easily installed into the pressure-resistant vessel. Moreover, connection between the pressure-resistant vessel and the connector connected to the central pipe of the separation membrane element located at the most downstream side is facilitated.

With respect to the above, it is preferable that the end surface holding members are also disposed respectively in the upstream-side end of the separation membrane element located at the most upstream side and in the downstream-side end of the separation membrane element located at the most downstream side, and an annular sealing member is mounted in the respective grooves of the end surface holding members disposed in the upstream-side end and in the downstream-side end. With this constitution, the end surface holding member for holding the connection member and the end surface holding member for holding the annular sealing member can be used in common, so that the costs can be reduced, and moreover, there will be no need to select these end surface holding members, thereby improving the workability at the time of mounting the end surface holding members. Also, since the annular sealing member is provided only on the separation membrane element located at the most upstream side and on the separation membrane element located at the most downstream side, the number of mounted annular sealing members that are liable to become frictional resistance can be reduced, whereby the frictional resistance at the time of installation can be easily reduced. In this case, the cross-sectional shape of the aforesaid annular sealing member is not particularly limited and may be a round shape, an elliptic shape, a rectangular shape, or the like; however, the cross-sectional shape is preferably an X-letter shape in particular. This is because the frictional resistance at the time of installation can be more easily reduced.

Figure 1:
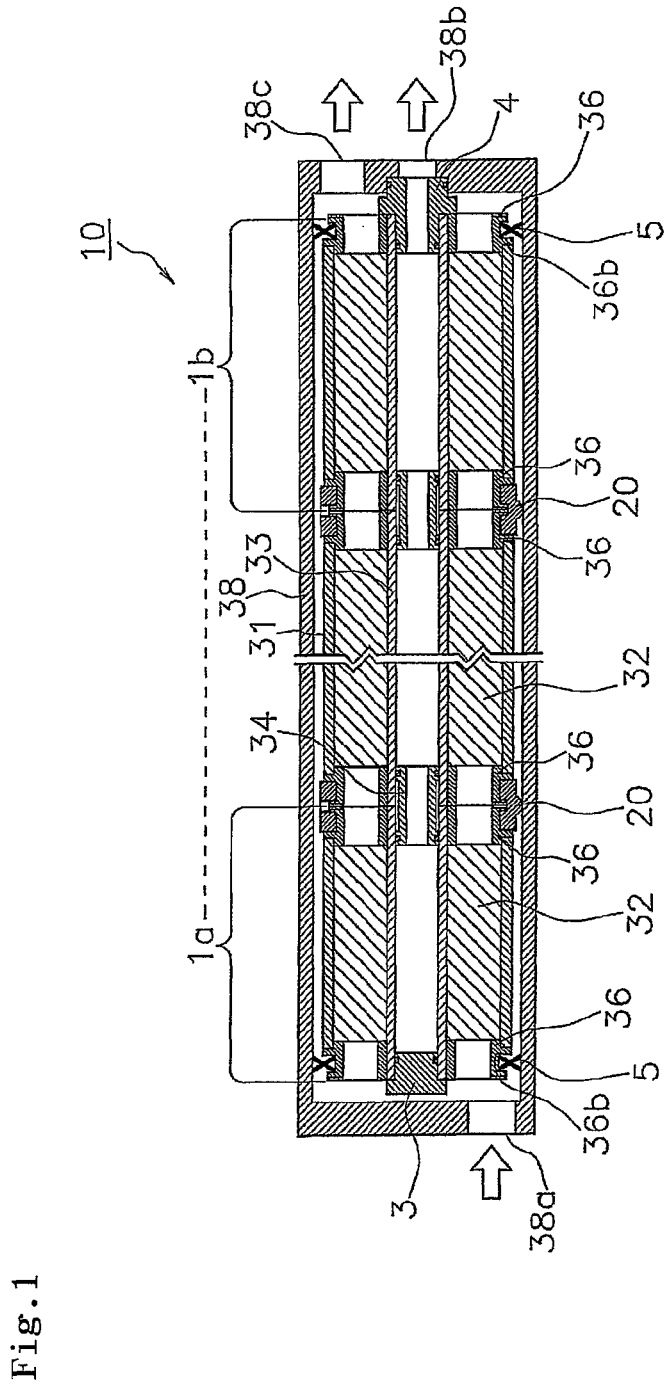
FIG. 1 is a schematic cross-sectional view illustrating one example of the separation membrane module of the present invention.

DESCRIPTION OF THE SYMBOLS 1a, 1b membrane element
3 cap
4 connector
5 annular sealing member
10 spiral-type membrane module
20 connection member
20a base body
20b protrusion
20c hinge part
20d through-hole
31 FRP
32 wound body
33 central pipe
34 connection pipe
35 O-ring
36 end surface holding member
36a hub plate
36b groove
37 annular sealing member
38 pressure-resistant vessel
38a supplied liquid inlet
38b permeated liquid outlet
38c concentrated liquid outlet
39 groove

BEST MODES FOR CARRYING OUT THE INVENTION

Figure 2:
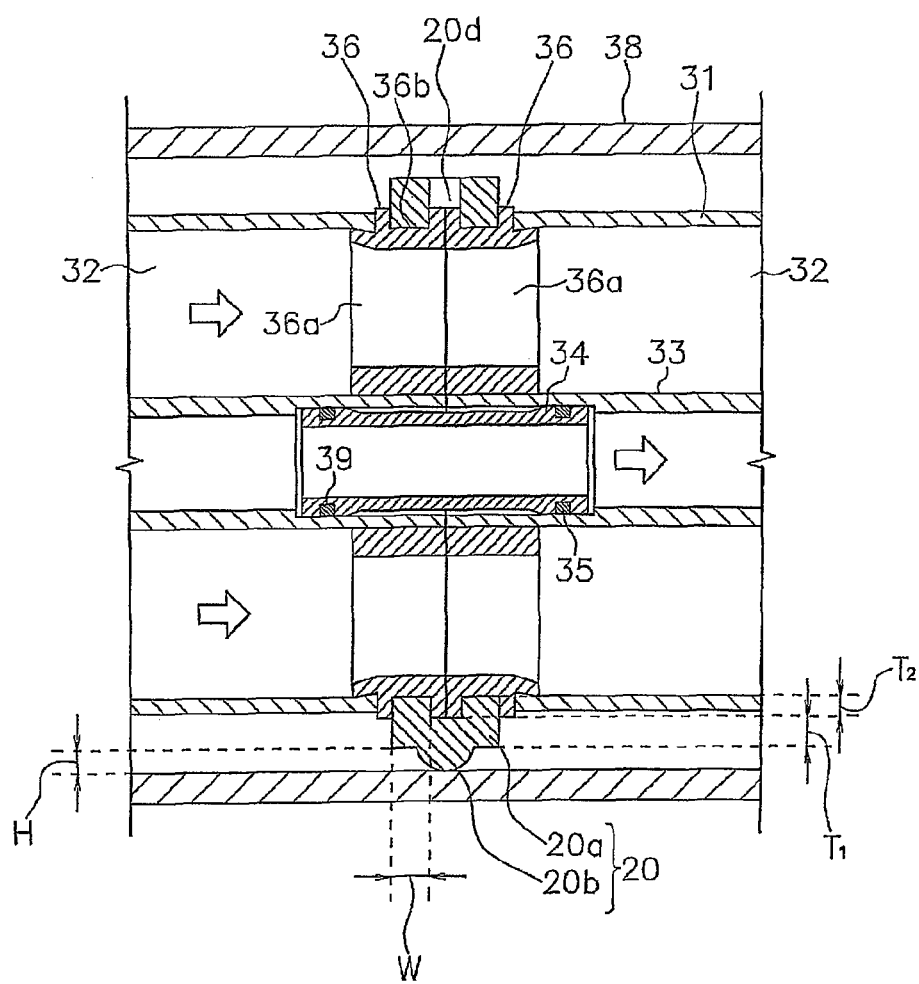
FIG. 2 is a cross-sectional view of an essential part illustrating the element connection part of the separation membrane module of FIG. 1.
Figure 3:
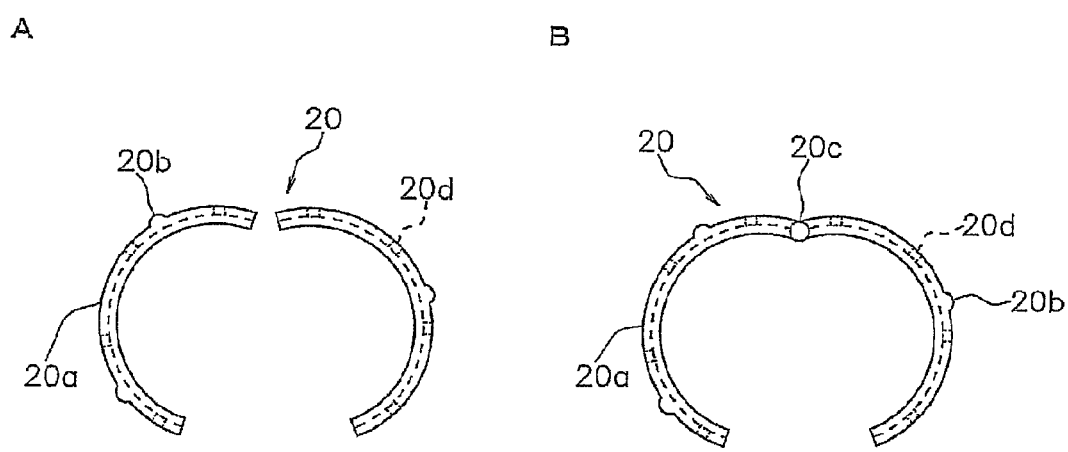
FIGS. 3A and 3B are schematic plan views illustrating one example of the connection member of the present invention.
Figure 4:
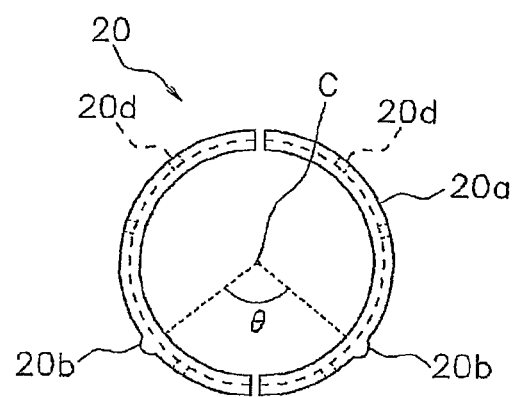
FIG. 4 is a schematic plan view illustrating another example of the connection member of the present invention.
Figure 5:
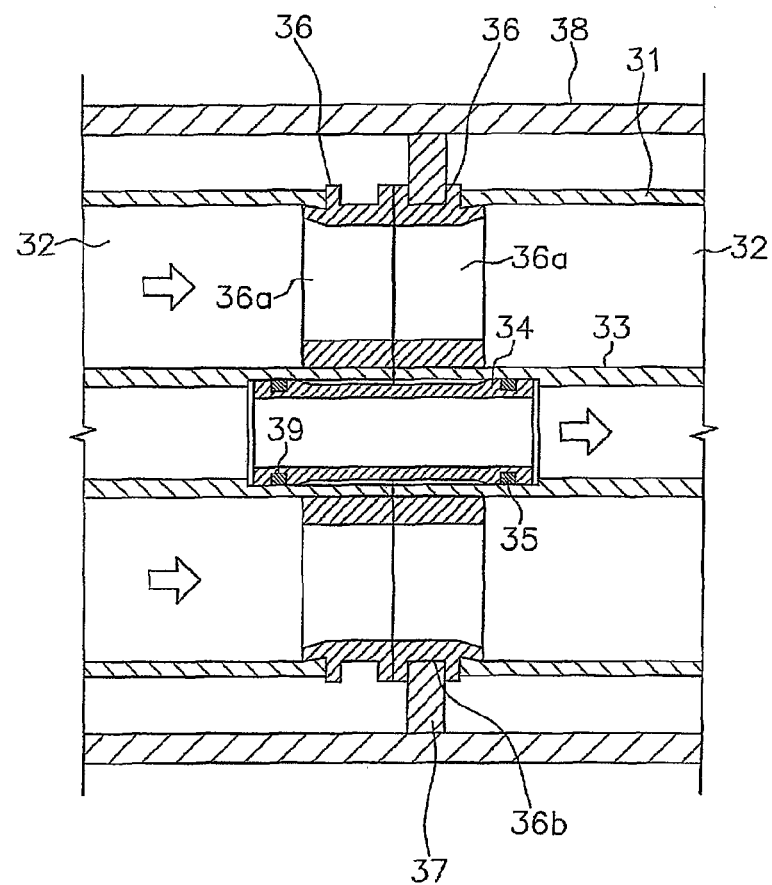
FIG. 5 is a cross-sectional view of an essential part illustrating the element connection part of a conventional spiral-type membrane module.

Hereafter, embodiments of the present invention will be described with reference to the drawings. FIG. 1 is a schematic cross-sectional view of a spiral-type membrane module which is one example of the separation membrane module of the present invention, and FIG. 2 is a cross-sectional view of an essential part illustrating the element connection part of the spiral-type membrane module of FIG. 1. Also, FIGS. 3 and 4 are schematic plan views illustrating one example of the connection member of the present invention. Here, some parts are illustrated in a larger scale or in a smaller scale for the sake of simplification of the description. Also, the members having the same constitution as those described in the background art will be denoted with the same symbols, and the description thereof will be omitted.

Referring to FIG. 1, in a spiral-type membrane module 10, a plurality of membrane elements are connected in series and installed into a pressure-resistant vessel 38 from a membrane element 1a located on the most upstream side to a membrane element 1b located on the most downstream side. The number of the connected membrane elements is not particularly limited; however, the number is, for example, about 2 to 8. In actually performing fluid separation, a supply liquid is supplied to a supply liquid inlet 38a disposed in the pressure-resistant vessel 38, and a permeated liquid and a concentrated liquid are taken out from a permeated liquid outlet 38b and a concentrated liquid outlet 38c disposed in the pressure-resistant vessel 38, respectively, after passing through the plurality of connected membrane elements. Here, a cap 3 is mounted on the upstream end of a central pipe 33 of the membrane element 1a located on the most upstream side for preventing the supply liquid from flowing therein. Also, the central pipe 33 of the membrane element 1b located on the most downstream side and the permeated liquid outlet 38b are connected by a connector 4.

Adjacent wound bodies 32 are connected by using an end surface holding member 36 and a connection member 20. That is, adjacent membrane elements are connected by the connection member 20. As shown in FIG. 2, this connection member 20 has a base body 20a having a cross-section shaped like an open box and a protrusion 20b disposed on this base body 20a. Then, the base body 20a bridges across and is engaged with respective grooves 36b of the end surface holding members 36 adjacent to each other.

As an example of the connection member 20, there are members in which constituent elements having a semicircular shape in a plan view are combined as shown in FIG. 3A and members in which constituent elements having a semicircular shape in a plan view are connected through a hinge part 20c as shown in FIG. 3B. In both of FIGS. 3A and 3B, three protrusions 20b are provided along the circumferential direction of the outer circumferential part of the base body 20a. Then, each of these protrusions 20b abuts against the inner surface of the pressure-resistant vessel 38 as shown in FIG. 2. Here, the radius of curvature of each constituent element shown in FIGS. 3A and 3B before the engagement may be smaller than the radius of curvature after the engagement. In this case, when the base body 20a is formed, for example, of an elastic body such as hard rubber, an elastic force is applied to the base body 20a after the engagement in the direction of fastening the end surface holding member 36, so that the connection of the membrane elements with each other will be easier. Also, when a magnet is buried at an end of each constituent element shown in FIGS. 3A and 3B, the connection of the membrane elements with each other will be easier by a magnetic force applied between the ends of the constituent elements when the membrane elements are connected with each other.

Also, the number of the protrusions 20b of the connection member 20 may be set to be an arbitrary number larger than two. When there are two protrusions 20b, it is preferable to dispose the protrusions 20b so that the two protrusions 20b will be below the central axis C of the membrane element as shown in FIG. 4. Thus, the protrusions 20b can be made to abut suitably against the inner surface of the pressure-resistant vessel 38, and the central axis C of the membrane element can be made to coincide with the central axis of the pressure-resistant vessel 38. At this time, the central angle θ of a circular arc formed by the adjacent two protrusions 20b can be set to be an arbitrary angle less than 180° as long as an object of the present invention can be achieved; however, the central angle is preferably 135° or less in order to reduce the frictional resistance at the time of installation and to facilitate the installation. Also, at the time of installing the membrane elements, in order to reduce the influence in a case where the line bisecting the central angle θ is a little shifted from the plumb line and to uniformize the load on the two protrusions 20b as much as possible, the central angle θ is preferably 20° or more, more preferably 45° or more.

When three or more protrusions 20b are provided, it is preferable to dispose the protrusions 20b at an approximately equal interval. Thus, the central axis of the membrane element can be made to coincide with the central axis of the pressure-resistant vessel 38 easily. Also, the membrane element may rotate within the pressure-resistant vessel 38 around the central axis thereof by a slight movement of the module accompanying the water flow during the operation, the start, or the stop. At this time, when three or more protrusions 20b are disposed at an approximately equal interval, the membrane element can be supported by the protrusions 20b with certainty even if the membrane element rotates during the operation.

When the connection member 20 is made of a plurality of constituent elements, each constituent element may have a different shape as shown in FIG. 3, or may have the same shape as shown in FIG. 4. However, in view of using the components in common to reduce the costs, the constituent elements preferably have the same shape. Here, in FIGS. 3 and 4, a connection member 20 made of two constituent elements has been exemplified; however, the present invention is not limited thereto, so that a connection member 20 made of three or more constituent elements may be used as well. In this case also, it is preferable that a sum of three or more protrusions 20b is disposed at an approximately equal interval and the constituent elements have the same shape in view of the function and the cost reduction.

The connection member 20 can reduce the relative displacement of the membrane elements with each other by allowing the base body 20a to be engaged with the respective grooves 36b. This can reduce abrasion of an O-ring 35 mounted between the connection pipe 34 and the central pipe 33, whereby leakage from a supply side to a permeation side can be prevented by a simple means. Also, since the membrane elements are connected with each other by engagement of the base body 20a with the respective grooves 36b, a slight relative displacement of the membrane elements with each other is allowed. This can improve the handling property at the time of installing the membrane elements into the pressure-resistant vessel 38. Further, because of having the protrusions 20b, the connection member 20 can prevent the contact between an FRP 31 and the inner surface of the pressure-resistant vessel 38. This can reduce the frictional resistance at the time of installation, so that the membrane elements can be easily installed into the pressure-resistant vessel 38. That is, the protrusions 20b correspond to a frictional resistance reduction structure that reduces the frictional resistance to the inner surface of the pressure-resistant vessel 38. Also, since the connection member 20 has the protrusions 20b, the membrane elements can be placed at the center in the radial direction of the pressure-resistant vessel 38. This facilitates connection between the connector 4 (See FIG. 1) connected to the central pipe 33 of the membrane element 1b located on the most downstream side and the permeated liquid outlet 38b disposed in the pressure-resistant vessel 38.

It is sufficient that a height H (See FIG. 2) of the protrusions 20b of the connection member 20 is of such a degree that the FRP 31 is not brought into contact with the inner surface of the pressure-resistant vessel 38, and is, for example, about 0.5 to 5 mm; however, the height H is preferably 1 to 3 mm, more preferably 1.5 to 2.5 mm in order to prevent the contact between the FRP 31 and the inner surface of the pressure-resistant vessel 38 with certainty at the time of installation and to ensure the mechanical strength of the protrusions 20b at the time of installation. Here, the shape of the protrusions 20b is not particularly limited, so that those having a ball shape, an elliptic ball shape, a trapezoidal shape, or the like can be used; however, the protrusions 20b preferably have a ball shape in order to reduce the frictional resistance effectively at the time of installation In the base body 20a of the connection member 20, it is sufficient that a thickness $T_1$ (See FIG. 2) of the part that bridges across the end surface holding members 36 adjacent to each other is of such a degree that the membrane elements can be connected with each other and the relative displacement of these can be reduced, and is, for example, 5 to 20 mm. Also, it is sufficient that a width W (See FIG. 2) and a thickness $T_2$ (See FIG. 2) of the engaging part of the base body 20a are set in accordance with the width and the depth of the groove 36b, respectively. However, in order to further improve the handling property at the time of installing the membrane elements into the pressure-resistant vessel 38, the width W and the thickness $T_2$ of the engaging part of the base body 20a are preferably smaller by 0.5 to 1.5 mm than the width and the depth of the groove 36b, respectively. Here, the width of the groove 36b of the end surface holding member 36 is typically 7 to 12 mm. Also, the depth of the groove 36b of the end surface holding member 36 is typically 6 to 12 mm.

Also, in the embodiment shown in FIG. 2, in the base body 20a of the connection member 20, a through-hole 20d that establishes communication between the inner circumferential part and the outer circumferential part thereof is formed. If a high pressure difference is generated between the inside and the outside of the membrane element when a sudden pressure change is applied to the membrane element, there is a fear that the membrane element may be exploded. However, when the through-hole 20d is provided, a fluid flows evenly the gap between the FRP 31 and the inner surface of the pressure-resistant vessel 38 by passing through this through-hole 20d, so that the pressure difference between the inside and the outside of the membrane element can be reduced. The hole diameter of the through-hole 20d is not particularly limited, and may be, for example, about 1 to 5 mm; however, the hole diameter is preferably 2 to 3 mm in order to reduce the aforesaid pressure difference effectively. The number of the through-holes 20d is not also particularly limited, and may be, for example, about 4 to 12; however, the number is preferably 6 to 8 in order to reduce the aforesaid pressure difference effectively. Here, when the through-hole 20d is provided in the base body 20b, it is preferable that the groove disclosed in Japanese Patent Application Laid-open No. 2005-111473 or a communicating passageway disclosed in Japanese Patent Application Laid-open No. 2006-212514 is formed in the end surface holding member 36, and the through-hole 20d is placed to accord to this groove or the passageway, because the aforesaid pressure difference can be reduced effectively.

The material for forming the protrusion 20b of the connection member 20 is not particularly limited, however, it is preferably formed of hard rubber such as ebonite or a synthetic resin such as an acrylonitrile butadiene styrene resin (ABS resin), a polyphenylene ether resin (PPE resin), a polyamide resin, or a fluororesin. This is because the frictional resistance at the time of installation can be further reduced, and moreover, it is possible to prevent the protrusion 20b from damaging the inner surface of the pressure-resistant vessel 38. Among these, hard rubber can prevent the damage of the inner surface of the pressure-resistant vessel 38 with certainty because a slight elastic deformation is allowed. Also, a fluororesin can be preferably used in view of easy lubricity and durability. Here, a reinforcing material such as glass fiber may be added to the aforesaid synthetic resin.

The material for forming the base body 20a of the connection member 20 is not also particularly limited; however, it is preferably formed of the hard rubber mentioned above, the synthetic resin mentioned above, or metal such as highly anticorrosive stainless steel or a titanium alloy. This is because the membrane elements can be easily connected with each other. Among these, since a slight elastic deformation of hard rubber is allowed, a slight relative displacement of the membrane elements with each other is allowed. Therefore, when a base body 20a formed of hard rubber is used, the handling property at the time of installing the membrane elements into the pressure-resistant vessel 38 can be improved. Also, the base body 20a and the protrusion 20b may be made of the same material or may be formed of different materials. When they are made of the same material, the mechanical strength will be improved, and the productivity will be also improved, hence preferable. On the other hand, when they are made of different materials, a connection member 20 making the most of the properties of individual materials can be obtained. For example, it is possible to select hard rubber for the material of the base body 20a by emphasizing the handling property at the time of installing the membrane elements into the pressure-resistant vessel 38 and select a synthetic resin for the material of the protrusion 20b by emphasizing the effect of reducing the frictional resistance at the time of installation, whereby the connection member 20 can be formed by a known method such as an injection molding method from these materials.

Also, referring to FIG. 1, in the spiral-type membrane module 10, the end surface holding members 36 are also disposed respectively in an upstream-side end of the membrane element 1a located at the most upstream side and in a downstream-side end of the membrane element 1b located at the most downstream side, and an annular sealing member 5 is mounted in the respective grooves 36b of these end surface holding members 36. With this constitution, the end surface holding member 36 for holding the connection member 20 and the end surface holding member 36 for holding the annular sealing member 5 can be used in common, so that the costs can be reduced, and moreover, there will be no need to select these end surface holding members 36, thereby improving the workability at the time of mounting the end surface holding members 36. Also, since the annular sealing member 5 is provided only on the membrane element 1a located at the most upstream side and on the membrane element 1b located at the most downstream side, the frictional resistance at the time of installation can be easily reduced. The material of the annular sealing member 5 may be a general sealing material, and it is sufficient that the material is, for example, an elastic body such as rubber or an elastomer. Also, the shape of the annular sealing member 5 is not particularly limited; however, it is preferable that the cross-section thereof has an X-letter shape as shown in FIG. 1 because the frictional resistance at the time of installation can be more easily reduced.

As shown above, the preferable embodiments of the present invention have been described; however, the present invention is not limited to the aforesaid embodiments. For example, the connection member of the present invention is not limited to those shown in FIGS. 2 to 4, so that those having various shapes can be used as long as they bridge across and are engaged with the respective grooves of the end surface holding members adjacent to each other. For example, in FIG. 2, a base body 20a having a cross-section like an open box shape has been exemplified; however, it may be a base body having a cross-section like a U-letter shape, a V-letter shape, a C-letter shape, or the like.

Also, in FIGS. 3A and 3B, an example is shown in which three protrusions 20b are disposed at an approximately equal interval along the circumferential direction of the outer circumferential part of the base body 20a at the time of engagement. However, in the case of providing protrusions, the number of the protrusions is not particularly limited as long as the number is two or more. Also, the interval of disposing the protrusions is not particularly limited as long as each of the protrusions abuts against the inner surface of the pressure-resistant vessel. However, it is preferable to use a connection member in which three to ten protrusions are disposed at an approximately equal interval at the time of engagement in order to place the membrane elements with certainty at the center in the radial direction of the pressure-resistant vessel and to reduce the frictional resistance effectively at the time of installation.

Also, the connection member of the present invention does not need to be provided over the whole circumference of the grooves of the end surface holding members as long as the abrasion of the sealing member such as an O-ring can be prevented by reducing the relative displacement of the membrane elements with each other. For example, it is also possible to use those in which an end of the base body 20a shown in FIGS. 3A and 3B is lost. In this case, an effect similar to the one in which the through-hole 20d is provided in the base body 20a is produced.

Also, as the connection member of the present invention, it is possible to use those in which the constituent elements are scattered by having lost parts instead of having a serial structure in a state of being engaged with the grooves of the end surface holding members. When a protrusion is provided in the connection member in which the constituent elements are scattered, there is no need to provide the protrusion in all of the constituent elements. It is sufficient that there is a sum of two or more protrusions, and it is preferable to provide three to ten protrusions.

Also, in the above embodiments, a connection member having a protrusion as the frictional resistance reduction structure has been exemplified; however, the frictional resistance reduction structure is not limited to a protrusion. For example, a groove may be provided in a direction perpendicular to the circumferential direction of the outer circumferential part of the connection member. In this case, the contact area between the connection member and the inner surface of the pressure-resistant vessel is reduced, whereby the frictional resistance to the inner surface of the pressure-resistant vessel can be reduced. The cross-sectional shape of the aforesaid groove is not particularly limited, so that it may be any shape such as a V-letter shape, a U-letter shape, or a rectangular shape.

Also, as the frictional resistance reduction structure, fine unevenness processing can be carried out on the outer surface of the connection member. The shape of the unevenness is not particularly limited as long as the frictional resistance can be reduced, and may be any shape such as an embossed shape or an impressed shape.

Also, as the frictional resistance reduction structure, the connection member can be formed of a material having a high lubrication property. As the material having a high lubrication property, a fluororesin and the like can be exemplified.

Also, as the frictional resistance reduction structure, a material having a high lubrication property may be applied onto the outer surface of the connection member. For example, a material having a high lubrication property can be applied by fluororesin coating or wax processing. In this case, an application material that does not affect the properties of the fluid to be processed must be selected.

Also, as the frictional resistance reduction structure, a rotor may be disposed on the outer surface of the connection member. As the rotor, a roller that rotates in a direction perpendicular to the circumferential direction of the outer circumferential part of the connection member, a ball body having a ball bearing structure, and the like can be exemplified.

Here, in the connection member of the present invention, the aforesaid protrusions as well as the other frictional resistance reduction structures mentioned above are not the necessary constituent elements as long as the connection member has a structure of bridging across and being engaged with the respective grooves of the end surface holding members adjacent to each other at the time of connecting the separation membrane elements with each other.

The invention claimed is:

1. A separation membrane module in which a plurality of separation membrane elements equipped with end surface holding members disposed at ends of the separation membrane elements are connected in series and installed into a pressure-resistant vessel, wherein
the plurality of separation membrane elements are connected in series by using a connection member, the connection member comprising engagement portions formed around the end surface holding member, the connection member also comprising a frictional resistance reduction structure that reduces frictional resistance on an inner surface of the pressure-resistant vessel,
a continuous annular groove is formed in each of the end surface holding members in the circumferential direction of an outer circumferential part thereof,
the connection member bridges across and is engaged with the respective continuous annular grooves of the end surface holding members adjacent to each other when the separation membrane elements are connected to each other, and
a through-hole that establishes communication between the inner circumferential part and the outer circumferential part thereof is formed in the connection member.

2. The separation membrane module according to claim 1, wherein
the connection member has a base body that bridges across and is engaged with the respective grooves of the end surface holding members adjacent to each other when the separation membrane elements are connected to each other, and two or more protrusions disposed along the circumferential direction of an outer circumferential part of the base body, and
each of the protrusions abuts against the inner surface of the pressure-resistant vessel when the plurality of connected separation membrane elements are installed into the pressure-resistant vessel.

3. The separation membrane module according to claim 1, wherein
the end surface holding members are also disposed respectively in the upstream-side end of the separation membrane element located at the most upstream side and in the downstream-side end of the separation membrane element located at the most downstream side, and
an annular sealing member is mounted in the respective grooves of the end surface holding members disposed in the upstream-side end and in the downstream-side end.

4. The separation membrane module according to claim 3, wherein the annular sealing member has an X-letter-shaped cross-section.

5. The separation membrane module according to claim 1, having a base body that bridges across and is engaged with the respective grooves of the end surface holding members adjacent to each other when the separation membrane elements are connected to each other, and two or more protrusions disposed along the circumferential direction of an outer circumferential part of the base body.

6. The separation membrane module according to claim 5, wherein the protrusion is formed with at least one kind of a material selected from hard rubber and a synthetic resin.

7. The separation membrane module according to claim 1, wherein the connection member is formed with at least one kind of a material selected from hard rubber, a synthetic resin, and metal.

8. The separation membrane module according to claim 1, wherein the connection member has a plurality of constituent elements.

* * * * *

UNITED STATES PATENT AND TRADEMARK OFFICE
CERTIFICATE OF CORRECTION

| | | |
|---|---|---|
| PATENT NO. | : 8,568,589 B2 | Page 1 of 1 |
| APPLICATION NO. | : 12/865509 | |
| DATED | : October 29, 2013 | |
| INVENTOR(S) | : Uda et al. | |

It is certified that error appears in the above-identified patent and that said Letters Patent is hereby corrected as shown below:

In the Specification

Column 8 at line 9, delete "installation" and insert --installation.--.

Signed and Sealed this
Nineteenth Day of August, 2014

Michelle K. Lee
*Deputy Director of the United States Patent and Trademark Office*